(12) United States Patent
Hillis et al.

(10) Patent No.: US 8,012,025 B2
(45) Date of Patent: Sep. 6, 2011

(54) VIDEO GAME CONTROLLER HUB WITH CONTROL INPUT REDUCTION AND COMBINATION SCHEMES

(75) Inventors: W. Daniel Hillis, Encino, CA (US); Bran Ferren, Beverly Hills, CA (US)

(73) Assignee: Applied Minds, LLC, Glendale, CA (US)

( * ) Notice: Subject to any disclaimer, the term of this patent is extended or adjusted under 35 U.S.C. 154(b) by 1041 days.

(21) Appl. No.: 10/735,400

(22) Filed: Dec. 11, 2003

(65) Prior Publication Data
US 2004/0178576 A1   Sep. 16, 2004

Related U.S. Application Data

(60) Provisional application No. 60/433,050, filed on Dec. 13, 2002.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............ 463/43; 364/434; 244/234; 463/37; 463/23; 463/29; 463/42; 434/69; 434/43; 434/33; 434/37; 701/3

(58) Field of Classification Search .................... 434/30, 434/31, 33, 45, 62; 463/36, 37, 38, 43
See application file for complete search history.

(56) References Cited

U.S. PATENT DOCUMENTS

| | | | |
|---|---|---|---|
| 2,895,005 A | 7/1959 | Kock et al. | |
| 3,116,365 A | 12/1963 | Prescott | |
| 3,992,586 A | 11/1976 | Jaffe | |
| 4,688,443 A | * 8/1987 | Fabre et al. | 74/469 |

(Continued)

FOREIGN PATENT DOCUMENTS

EP    1182590    2/2002

(Continued)

OTHER PUBLICATIONS

Nelson, C., "Use of Metadata Registries for Searching for Statistical Data," Jul. 24-26, 2002, Dimension EDI Ltd., Proceedings of the 14th International Conference on Scientific and Statistical Database Management, pp. 232-235.

(Continued)

*Primary Examiner* — Paul A. D'Agostino
(74) *Attorney, Agent, or Firm* — Michael A. Glenn; Glenn Patent Group

(57) ABSTRACT

A video game controller hub receives a number of control input sets from an equal number of video game controllers, and provides a preferably smaller number of control input sets to a video game console. Each of the control input sets provided to the video game console by the controller hub is used to control a distinct on-screen entity, e.g. vehicle, character, or team. A number of players therefore collectively control a single on-screen entity. The reduction in the number of control input sets is performed according to reduction and combination schemes that are preferably specified by the user to suit a particular video game. The reduction in the number of control input sets increases the number of players that may concurrently participate in a video game without requiring support from the video game console or software, and the collaborative nature of the control of on-screen entities provides for exciting variations in game play.

4 Claims, 2 Drawing Sheets

U.S. PATENT DOCUMENTS

| | | | |
|---|---|---|---|
| 4,847,784 A | 7/1989 | Clancey | |
| 4,853,873 A | 8/1989 | Tsuji et al. | |
| 4,881,135 A | 11/1989 | Heilweil | |
| 4,996,642 A | 2/1991 | Hey | |
| 5,073,934 A | 12/1991 | Matyas et al. | |
| 5,117,258 A | 5/1992 | Iwata | |
| 5,133,045 A | 7/1992 | Gaither et al. | |
| 5,212,768 A | 5/1993 | Itsuki et al. | |
| 5,404,295 A | 4/1995 | Katz et al. | |
| 5,404,305 A * | 4/1995 | Stiles, Jr. | 701/3 |
| 5,426,510 A | 6/1995 | Meredith | |
| 5,430,473 A | 7/1995 | Beecher, II et al. | |
| 5,500,671 A | 3/1996 | Andersson et al. | |
| 5,511,122 A | 4/1996 | Atkinson | |
| 5,577,913 A * | 11/1996 | Moncrief et al. | 434/69 |
| 5,597,312 A | 1/1997 | Bloom et al. | |
| 5,598,209 A | 1/1997 | Cortjens et al. | |
| 5,612,734 A | 3/1997 | Nelson et al. | |
| 5,678,999 A * | 10/1997 | Cicare | 434/33 |
| 5,701,400 A | 12/1997 | Amado | |
| H1728 H * | 5/1998 | Kelso et al. | 434/43 |
| 5,751,337 A | 5/1998 | Allen et al. | |
| 5,751,809 A | 5/1998 | Davis et al. | |
| 5,867,799 A | 2/1999 | Lang et al. | |
| 5,907,619 A | 5/1999 | Davis | |
| 5,929,844 A * | 7/1999 | Barnes | 345/156 |
| 5,940,513 A | 8/1999 | Aucsmith et al. | |
| 5,956,404 A | 9/1999 | Schneier et al. | |
| 5,963,245 A | 10/1999 | McDonald | |
| 5,995,624 A | 11/1999 | Fielder et al. | |
| 6,003,021 A | 12/1999 | Zadik et al. | |
| 6,009,173 A | 12/1999 | Sumner | |
| 6,070,149 A | 5/2000 | Tavor et al. | |
| 6,076,091 A | 6/2000 | Fohn et al. | |
| 6,076,163 A | 6/2000 | Hoffstein et al. | |
| 6,098,065 A | 8/2000 | Skillen et al. | |
| 6,125,445 A | 9/2000 | Arditti et al. | |
| 6,131,162 A | 10/2000 | Yoshiura et al. | |
| 6,171,109 B1 | 1/2001 | Ohsuga | |
| 6,185,558 B1 | 2/2001 | Bowman et al. | |
| 6,202,060 B1 | 3/2001 | Tran | |
| 6,202,062 B1 | 3/2001 | Cameron et al. | |
| 6,226,742 B1 | 5/2001 | Jakubowski et al. | |
| 6,230,269 B1 | 5/2001 | Spies et al. | |
| 6,283,757 B1 * | 9/2001 | Meghnot et al. | 434/33 |
| 6,292,211 B1 | 9/2001 | Pena | |
| 6,311,194 B1 | 10/2001 | Sheth et al. | |
| 6,341,960 B1 | 1/2002 | Frasson et al. | |
| 6,394,904 B1 * | 5/2002 | Stalker | 463/23 |
| 6,401,206 B1 | 6/2002 | Khan et al. | |
| 6,438,691 B1 | 8/2002 | Mao | |
| 6,471,586 B1 * | 10/2002 | Aiki et al. | 463/6 |
| 6,477,520 B1 | 11/2002 | Malaviya et al. | |
| 6,499,105 B1 | 12/2002 | Yoshiura et al. | |
| 6,507,357 B2 | 1/2003 | Hillis et al. | |
| 6,633,981 B1 | 10/2003 | Davis | |
| 6,714,234 B1 | 3/2004 | Hillis et al. | |
| 6,732,090 B2 | 5/2004 | Shanahan et al. | |
| 6,751,773 B2 | 6/2004 | Okabayashi et al. | |
| 6,789,126 B1 | 9/2004 | Saulpaugh et al. | |
| 6,807,535 B2 | 10/2004 | Goodkovsky | |
| 6,827,578 B2 | 12/2004 | Krebs et al. | |
| 6,884,074 B2 | 4/2005 | Theilmann et al. | |
| 6,975,833 B2 | 12/2005 | Theilmann et al. | |
| 6,980,974 B2 | 12/2005 | Kobayashi et al. | |
| 6,988,198 B1 | 1/2006 | Zuccherato et al. | |
| 7,000,118 B1 | 2/2006 | Murthy et al. | |
| 7,100,051 B1 | 8/2006 | Kipnis et al. | |
| 7,263,529 B2 | 8/2007 | Cordery et al. | |
| 2001/0034837 A1 | 10/2001 | Kauski et al. | |
| 2002/0013780 A1 | 1/2002 | Brown et al. | |
| 2002/0016840 A1 | 2/2002 | Herzog et al. | |
| 2002/0023093 A1 | 2/2002 | Ziff et al. | |
| 2002/0026583 A1 | 2/2002 | Harrison et al. | |
| 2002/0049692 A1 | 4/2002 | Venkatram | |
| 2002/0069079 A1 | 6/2002 | Vega | |
| 2002/0072410 A1 * | 6/2002 | Tanaka et al. | 463/37 |
| 2002/0073080 A1 | 6/2002 | Lipkin | |
| 2002/0091836 A1 | 7/2002 | Moetteli | |
| 2002/0095579 A1 | 7/2002 | Yoshiura et al. | |
| 2002/0126120 A1 | 9/2002 | Snowdon et al. | |
| 2002/0161603 A1 | 10/2002 | Gonzales | |
| 2003/0093790 A1 | 5/2003 | Logan et al. | |
| 2003/0134675 A1 | 7/2003 | Oberberger | |
| 2003/0152893 A1 * | 8/2003 | Edgar | 434/37 |
| 2003/0188180 A1 | 10/2003 | Overney | |
| 2004/0097852 A1 * | 5/2004 | Boyd et al. | 601/47 |
| 2005/0060283 A1 | 3/2005 | Petras et al. | |
| 2005/0107912 A1 * | 5/2005 | Martin et al. | 700/232 |
| 2005/0119053 A1 * | 6/2005 | Suzuki et al. | 463/42 |
| 2005/0245316 A1 * | 11/2005 | Tanaka et al. | 463/37 |

FOREIGN PATENT DOCUMENTS

| | | |
|---|---|---|
| JP | 04322649 | 11/1992 |
| JP | 08084328 | 3/1996 |

OTHER PUBLICATIONS

Anguish Scott, "Storing your application's preferences and Support files," Jan. 14, 1998, Stepwise Server, http://www.stepwise.com.Articles/Technical/ApplicationStorage.html.

* cited by examiner

VIDEO GAME CONTROLLER HUB WITH CONTROL INPUT REDUCTION AND COMBINATION SCHEMES

RELATED APPLICATIONS

This application is related to U.S. Provisional Patent Application Ser. No. 60/433,050, filed Dec. 13, 2002, which application is incorporated herein in its entirety by the reference thereto.

BACKGROUND

1. Technical Field

The invention relates to video gaming consoles. In particular, the invention relates to systems for increasing the number of players that may concurrently participate in a video game.

2. Description of the Prior Art

The continued rise in popularity of video gaming consoles, such as the GameCube®, manufactured by Nintendo; the Playstation2®, manufactured by Sony Computer Entertainment, Inc.; and the Xbox®, manufactured by Microsoft Corporation, is a well known phenomenon. The sustained success of such platforms is in large part due to the greater realism of game play provided by increasingly sophisticated game physics and increasingly powerful graphics rendering engines.

However, another factor behind the increasing popularity is an improved ability of players to interact with one another meaningfully during game play. For example, multi-player adapters are available that increase the number of players that can participate in a video game. Whereas several consoles directly support connection for only two players, multi-player adapters allow four or more players to participate. An example is the InterAct Multiplayer Adapter manufactured by InterAct Accessories, Inc.

Multi-player adapters pass the control inputs generated by the controllers on to the video game console for interpretation by the game software. Thus, use of a multi-player adapter requires that the game software be designed to handle the increased number of control input sets. Use of multi-player adapters is thus limited to a fraction of all available games. Furthermore, because each controller connected to the multi-player adapter is used to control a separate on-screen entity, e.g. character or vehicle, as the number of participating players increases, the amount of screen real-estate dedicated to each entity must be decreased. For example, in racing games, each of four players is provided with a view of his vehicle, but only a relatively limited extent of the vehicle surroundings.

An alternative approach for providing multi-player interaction is network based game play, in which multiple players, each with a dedicated game console, share a common game state maintained by a networked game server. Each player's game console connects to the game server, and transmits to the server the actions of the local player. The console in turn receives from the server updates of the game state, for presentation to the local player on the local display. One such system is XboxLive®, operated by Microsoft Corporation.

While the networked based approach does address the above mentioned screen real estate issue, it too requires specialized support from game software. Furthermore, it requires network access the network game server that maintains the common game state. Each player must therefore have a network connection, and, typically, must also pay a subscription fee to gain access to the server.

What is needed is a system that allows multiple players to interact during video game play, but does not require specialized support from the game software, does not require access to a network or game server, and does not result in a reduction of on-screen real-estate dedicated to each player. Additionally, it would be desirable for the system to support and encourage new and exciting variations in game play and player interaction.

SUMMARY

In the preferred embodiment of the invention, a video game controller hub receives a number of control input sets from an equal number of video game controllers, and provides a preferably smaller number of control input sets to a video game console. Each of the control input sets provided to the video game console by the controller hub is used to control a distinct on-screen entity, e.g. vehicle, character, or team. A number of players therefore collectively control a single on-screen entity. The reduction in the number of control input sets is performed according to reduction and combination schemes that are preferably specified by the user to suit a particular video game. The reduction in the number of control input sets increases the number of players that may concurrently participate in a video game without requiring support from the video game console or software, and the collaborative nature of the control of on-screen entities provides for exciting variations in game play.

The reduction scheme specified indicates a mapping of the control input sets received by the controller hub onto the control input sets provided to the video game console, and therefore a mapping of controllers onto on-screen entities. The hub may be deactivated by specifying a one-to-one mapping of the control input sets received by the controller hub onto the control input sets provided to the video game console. The combination scheme specifies how corresponding control inputs within the control input sets are combined. In the preferred embodiments of the invention, the combination scheme uses combination procedures based on voting, selection, and averaging.

DESCRIPTION

The invention is a video game controller hub that receives a number of control input sets from an equal number of video game controllers, and provides a preferably smaller number of control input sets to a video game console. Each of the control input sets provided to the video game console by the controller hub is used to control a separate on-screen entity, e.g. vehicle, character, or team. The reduction in the number of control input sets is performed according to reduction and combination schemes that may be specified by the user to suit a particular video game. Thus, collaboratively, a number of players control a single on-screen entity. The reduction in the number of control input sets increases the number of players that may concurrently participate in a video game without requiring support from the video game software, and the collaborative nature of the control provides for exciting variations in game play.

Figure 1:
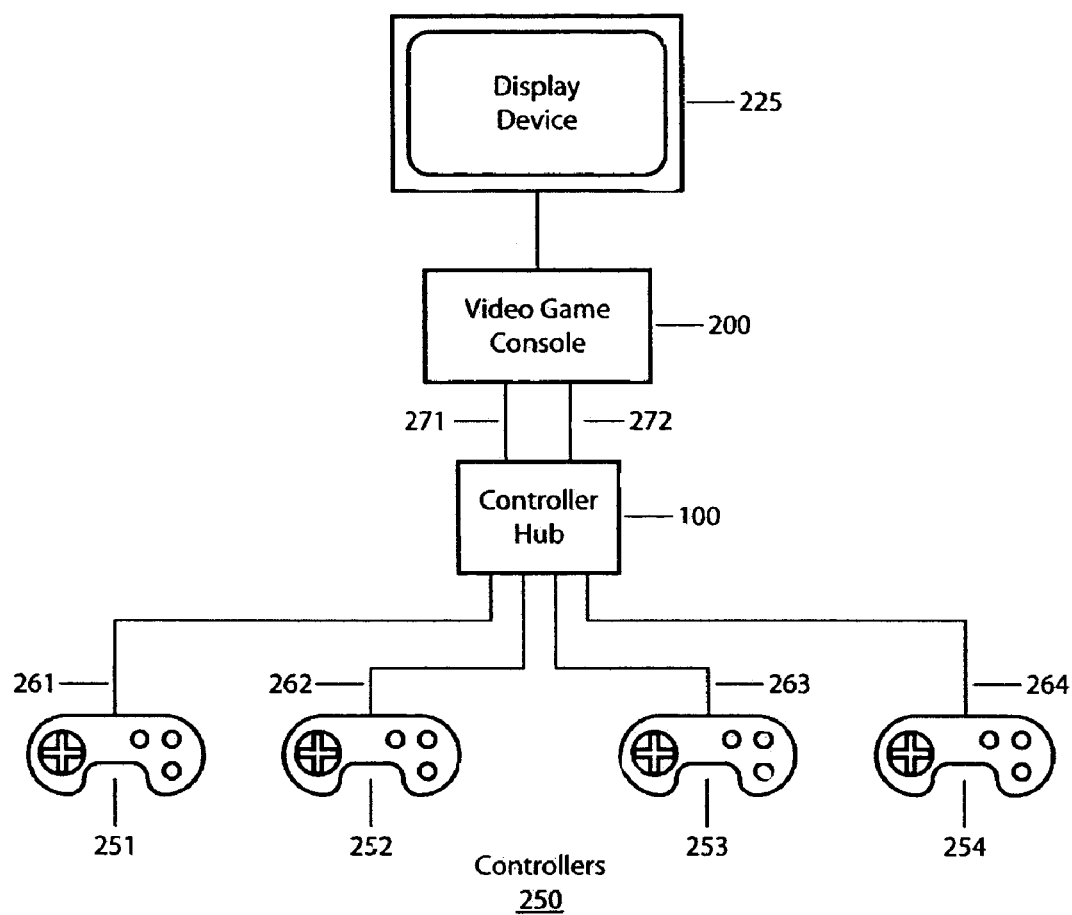
FIG. 1 shows a schematic representation of a controller hub connected to a plurality of controllers and a video game console according to the invention.

FIG. 1 shows a schematic representation of a controller hub connected to a plurality of controllers and a video game console according to the invention. A number of video game controllers 250 are connected to the controller hub 100. Each respective controller 251, 252, 253, and 254 is connected via a connection 261, 262, 263, and 264 that may be wire-based, wireless, or any other type that allows a control input set to be transmitted from the controller to the controller hub. The controller hub is connected to the video game console 200 by a smaller number of connections.

These connections 271 and 272 may also be wire-based, wireless, or any other type that allows a control input set to be transmitted from the controller hub to the video game console. Finally, the video game console is connected to a television or other display device 225, on which the on-screen entities and other video game content are presented to the participants.

For simplicity, four controller-to-controller hub connections and two controller hub-to-video game console connections are shown in FIG. 1. The number of control input sets provided to the game console by the controller hub is limited only by the number of control input sets that may be received by the console. It will be appreciated, based on the following description of control input set reduction schemes, that the number of control input sets that may be received by the controller hub is essentially unlimited.

It should also be noted that the connections between the controller hub and the video game console may be combined within a single physical connection if the video game console is designed to support the controller hub. However, the embodiment shown in FIG. 1 is preferred in that each of several separate connections carries a control input set. The hub therefore appears to the video game console as a (reduced) number of standard controllers, ensuring compatibility between the controller hub and the video game console and software.

The controller hub also provides power to the controllers to operate, for example, indicator lights or vibrating tactile feedback devices. In some cases, power provided to the hub through the connections to the video game console may be passed through to the controllers. In general, though, the hub is itself a powered device, as the power provided through the connections between the controller hub and the video game console is not sufficient to power the increased number of controllers connected to the controller hub.

Figure 2:
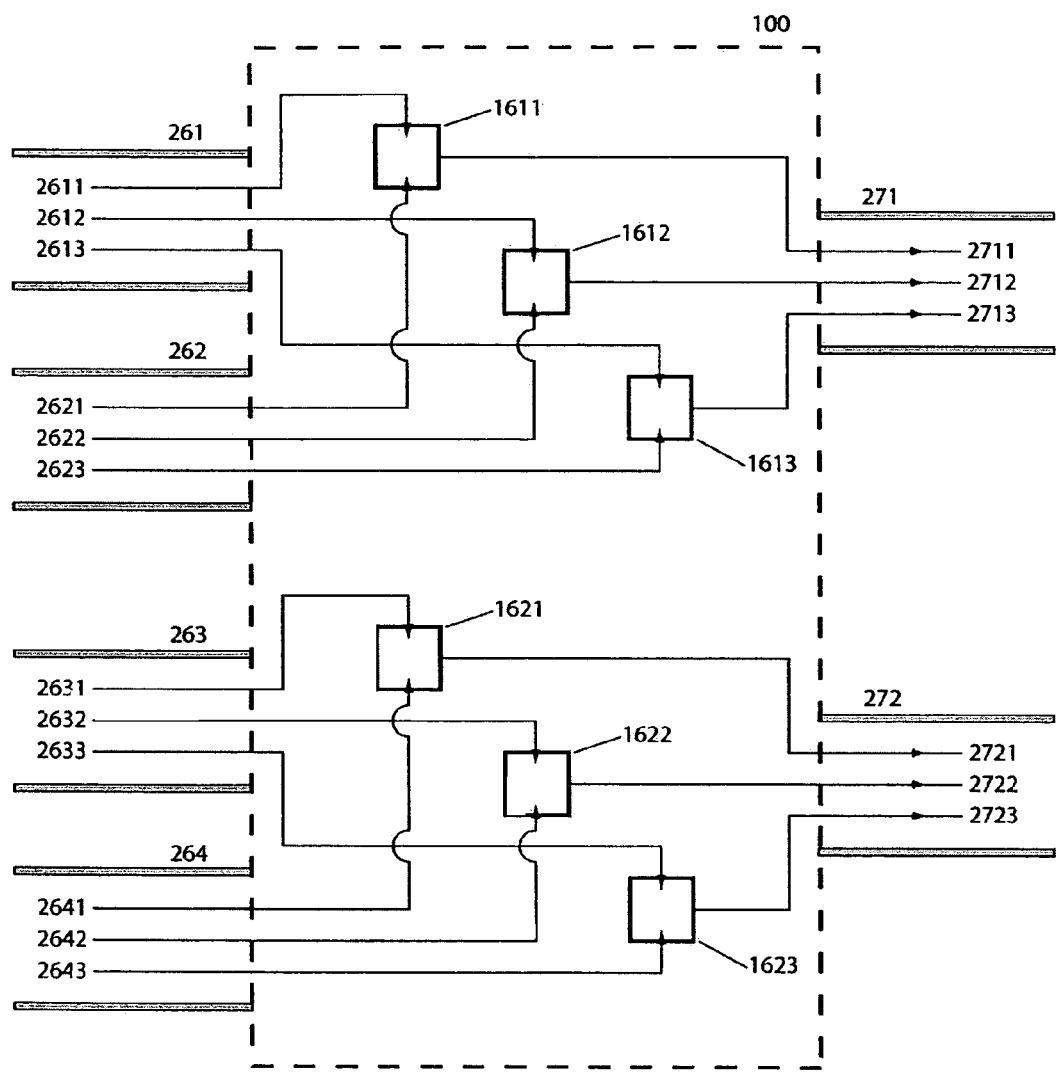
FIG. 2 shows a schematic representation of a control input reduction and combination scheme implemented by a controller hub according to the invention.

FIG. 2 shows a schematic representation of a control input reduction and combination scheme implemented by a controller hub according to the invention. The control input set 2611, 2612, and 2613 is provided to the controller hub 100 via the connection 261. Similarly, control input sets are provided to the controller hub via connections 262, 263 and 264. Each control input within a control input set corresponds to an individual input device on a controller, e.g. a button, slider, joystick, or directional touch pad. The number of control inputs within a control input set may thus vary from one game system to another. FIG. 2 shows three control inputs by way of example. Further, the control inputs may be of differing types, including Boolean (as for a button that is either depressed or not depressed), scalar (as for a linear slider), and vector (as for a joystick or directional touch pad).

Corresponding control inputs from within each of the control input sets from controllers 251 and 252 are provided to combiners 1611, 1612, and 1613. Similarly, corresponding control inputs from within each of the control input sets from controllers 253 and 254 are provided to combiners 1621, 1622, and 1623. Each of the combiners determines a single control input based on the values of the multiple control inputs that it receives from the controllers in accordance with a combination scheme. Specifically, combiners 1611, 1612, and 1613 determine control inputs 2711, 2712, and 2713, respectively. Similarly, combiners 1621, 1622, and 1623 determine control inputs 2721, 2722, and 2723, respectively.

The control inputs determined by the combiners comprise control input sets that are transmitted to the video game console via connections 271 and 272. The type of the control input determined by the combiner matches the type of the control inputs provided to the combiner. The compatibility (number and type of control inputs) of the control input sets transmitted to the video game console is thus ensured.

In this manner, the number of control input sets is reduced within the hub. Specifically, in the embodiment shown in FIG. 2, the control input sets associated with controllers 251 and 252 are combined to form a first control input set, and the control input sets associated with controllers 253 and 254 are combined to form a second control input set. The simple binary reduction shown in FIG. 2, i.e. four control input sets reduced to two control input sets via two pairings, is only one possible reduction scheme. In other embodiments of the invention, larger numbers of controllers are connected to the controller hub, and more than two control inputs are provided to each combiner. Larger numbers of control input sets, i.e. greater than two, may also be passed to the video game console. Furthermore, the number of control input sets combined to determine a control input set need not be the same for each control input set passed to the video game console. It is also possible that a control input set passed to the video game console be determined from a single control input set received from a single controller.

It should be appreciated that the reduction and combination scheme shown in FIG. 2 is represented schematically. The specific manner in which control input sets are received from the controllers and combined together may vary considerably from that represented without departing from the scope of the invention. In particular, in the case of controllers conforming to the Universal Serial Bus (USB) specification, the hub may contain a driver compatible with the controllers that interprets data packets transmitted over the bus to determine individual control inputs. The individual control inputs may then be combined, and the resulting control input sets reassembled into packets for transmission to the video game console via a USB connection. Further detail regarding such an implementation can be found at http://www.usb.org.

It is also anticipated that the hub can be deactivated, in which case the control inputs sets from the controllers are passed through the hub to the video game console without modification. Within the context of FIG. 2, this functionality may be implemented by combiners receiving only a single control input. This capability allows conventional game play to be restored without the inconvenience of disconnecting controllers from the hub and connecting controllers to the video game console.

The invention may also be used in combination with a multi-player adapter. In this embodiment of the invention, the controller hub 100 of FIG. 1 is connected to the multi-player adapter instead of the video game console 200. In this configuration, the maximum number of control input sets that may be provided by the controller hub is increased to the number accepted by the multi-player adapter. This further increases the total number of players that may concurrently participate in a video game, and provides further opportunity for novel control input reduction schemes.

As shown in FIG. 2, a given reduction scheme incorporates a combination scheme implemented by the combiners. A combination scheme specifies how a control input set provided to the video game console should be determined from the contributing control input sets specified by reduction scheme. The procedure used may differ from one control input to another within the control input set, and therefore from one combiner to another. The particular procedure used by a combiner depends on the type of control inputs received and the nature of the video game being played.

Exemplary combination procedures include voting, averaging, and selection. Voting is most readily applied to Boolean control inputs. In this case, the Boolean state, e.g. depressed or not depressed, most commonly represented among the control inputs received by the combiner is the determined control input included within the control input set provided to the video game console. Voting may be extended to scalar inputs through the use of thresholding, and to vector inputs through the use of compartmentalization.

An averaging procedure may be applied to Boolean, scalar, and vector control inputs. Averaging Boolean control inputs is effectively equivalent to a voting procedure. Several applicable procedures for averaging scalar and vector control inputs, such as linear, weighted, and root-mean-square averaging, are well known to those skilled in the art.

Utilization of a selection procedure results in the inclusion of one of the control inputs received by the combiner in the control input set provided to the video game console, to the exclusion of all other control inputs received by the combiner. A particular selection procedure may apply to all control inputs within a control input set or only a subset of the control inputs. In the former case, a single controller and therefore player is entirely responsible for control of the on-screen entity. In the latter case, each player controls a separate aspect of the functionality of the on-screen entity. Optionally, and particularly in the case where a selection procedure is applied uniformly to all control inputs within a control input set, the selected controller may be varied throughout the course of play by the controller hub. The selected controller may be selected at random or passed from one player to another in a "hot potato" fashion.

In some embodiments of the invention, the controller (and therefore player) providing each of the currently selected control inputs may be indicated on-screen. In other embodiments, the identity of the selected player remains unknown. Alternatively, the selected player may be revealed at a significant time during the course of play, such as after a round of play, e.g. a race, time period, board, or level, or after a player failure, e.g. death of an on-screen character or crash of an on-screen vehicle.

In the preferred embodiment of the invention, the specific reduction and combination schemes implemented by the controller hub may be specified by the participants through configuration interfaces. The interface for specifying the reduction scheme is best understood as a mapping of control input sets received by the controller hub onto the control input sets provided to the video game console, and therefore a mapping of controllers onto on-screen entities. For example, for the controller hub of FIG. 1 receiving control input sets from four controllers 251, 252, 253, and 254, the interface may be used to indicate that the control input sets from controllers 251 and 252 should be combined to control a first on-screen entity and the control input sets from controllers 253 and 254 should be used to control a second on-screen entity. Most simply, the interface for making such specifications is a series of buttons or switches on the exterior of the controller hub mapping controller set inputs to control set outputs. Alternatively, the interface may be a touch screen LCD display on the controller hub, or may be presented on the display device 225 via the game console, with selections made using the controllers. The interface therefore supports an arbitrary mapping of any number of controllers onto any number of on-screen entities.

Another interface allows participants to specify the combination scheme applied to each group of controllers mapped onto an on-screen character. The participants may specify a combination procedure for each of the control inputs within the control input set. The number and type of the control inputs within the control input set is preferably determined from a controller specification, such as that provided for USB Human Interface Device (HID) compliant controllers. Standard default settings may be offered so that the majority of users need not be concerned with the inner workings of the hub, while interested users are afforded the flexibility and excitement associated with the endless number of game play variations that can be created by altering the combination scheme.

As an illustrative example of how the invention operates, consider an off-road racing video game that provides support for only two players. In the ordinary course of play, a maximum of two players each control a single on-screen vehicle using a single controller. The controller hub allows a larger number of players to participate. For example, five players may connect five controllers to the hub and specify a reduction scheme in which teams of three and two players each combine to control a single on-screen vehicle. Each team also specifies the particular combination scheme that is used to combine the control input sets from their controllers into a single control input set to be passed to the video game console.

For example, the team of two may elect to use a selection based combination scheme, in which the control inputs associated with accelerating and braking the vehicle are selected from the control inputs provided by the first player's controller, but the control inputs associated with the steering of the vehicle are selected from the control inputs provided by the second player's controller. The two players must therefore exhibit true cooperation to control the on-screen vehicle successfully.

The team of three may elect to use an averaging combination scheme, in which scalar acceleration, braking, and steering inputs are averaged. If the first of the three players commands a rapid acceleration and no braking, the second player commands no acceleration and a mild braking, and the third player commands a mild acceleration and a no braking, the resulting inputs passed to the video game console correspond to a moderate acceleration and very mild braking, and the vehicle exhibits a slightly less than rapid acceleration. Similarly, if two of the three players command a sharp turn to the right while the third player commands a gentle turn to the left, the vehicle turns gently to the right. Other combination schemes are possible for each team, including schemes incorporating a mixture of voting, averaging, and selection.

In summary, by providing a wide variety of control input reduction and combination schemes, the controller hub offers endless variations on game play. Furthermore, the manner in which the reduction and combination are performed ensures compatibility with, and does not require dedicated support from, existing video game consoles and video game software. Most importantly, the controller hub allows larger numbers of players to participate in game play in a more collaborative and interactive manner.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following claims.

The invention claimed is:

1. A video game controller hub, comprising:
means for receiving at least three control input sets from a corresponding number of video game controllers, each of said control input sets comprising a plurality of control inputs;
means for reducing said control input sets to one reduced control input set according to a reduction scheme;
said means for reducing said control input sets comprising a configuration interface for specifying said reduction scheme as a mapping of said control input sets received by said video game controller hub onto said one reduced control input set;
said interface operable by at least one user of said video game controller hub to indicate how said control input sets are to be combined to control one on-screen entity depicted on a display device;
said mapping comprising an averaging of each said plurality of control inputs constituting said control input sets onto said one reduced control input set; and
means for providing said one reduced control input set to a video game console;
wherein said one reduced control input set determines an action of said corresponding on-screen entity; and
wherein said number of video game controllers collectively control said corresponding on-screen entity.

2. The video game controller hub of claim 1, wherein said corresponding on-screen entity comprises any of: a vehicle; a character; and a team.

3. A method for reducing at least three control input sets provided from a corresponding number of video game controllers to a video game controller hub, comprising:
receiving said control input sets from said video game controllers, each of said control input sets comprising a plurality of control inputs;
reducing said control input sets to one reduced control input set according to a reduction scheme;
said reducing said control input sets further comprising providing a configuration interface for specifying said reduction scheme as a mapping of said control input sets received by said video game controller hub onto said one reduced control input set;
at least one user of said video game controller hub operating said interface to indicate how said control input sets are to be combined to control said one on-screen entity depicted on a display device;
said mapping comprising averaging each said plurality of control inputs constituting said control input sets onto said one reduced control input set; and
providing said one reduced control input set to a video game console;
wherein said one reduced control input set determines an action of said corresponding on-screen entity; and
wherein said number of video game controllers collectively control said corresponding on-screen entity.

4. The method of claim 3, wherein said corresponding on-screen entity comprises any of: a vehicle; a character; and a team.

* * * * *